Jan. 19, 1971     C. A. ANDRYSICK     3,556,756
METHOD OF PRESSING INTRICATE GLASS ARTICLES
Filed Oct. 9, 1967
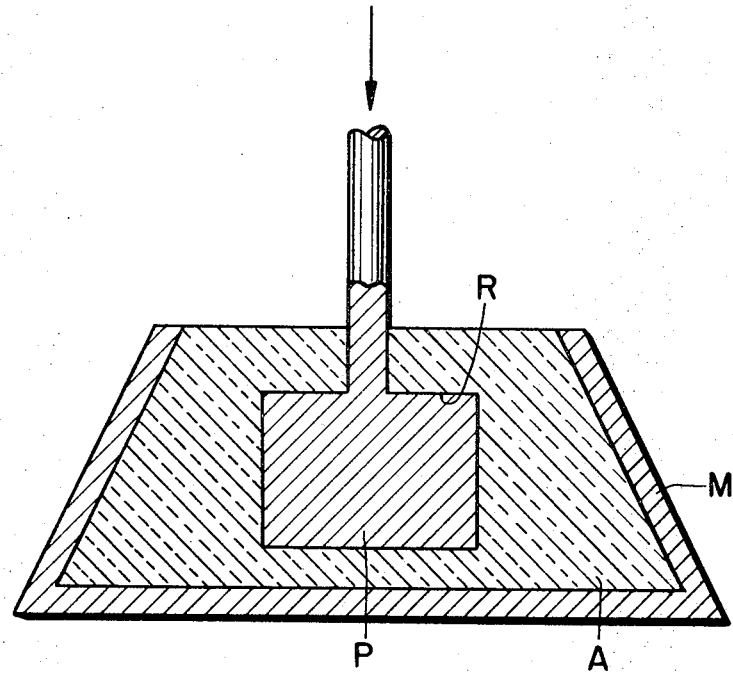
INVENTOR.
CHESTER A. ANDRYSICK
BY
ATTORNEY

# United States Patent Office 3,556,756
Patented Jan. 19, 1971

3,556,756
METHOD OF PRESSING INTRICATE GLASS ARTICLES
Chester A. Andrysick, Corning, N.Y., assignor to Corning Glass Works, Corning, N.Y., a corporation of New York
Filed Oct. 9, 1967, Ser. No. 673,656
Int. Cl. C03b 19/02
U.S. Cl. 65—23                                                      2 Claims

ABSTRACT OF THE DISCLOSURE

A method of press-forming intricate hollow glass articles having recessed or undercut portions by utilizing plunger and/or mold members with a melting temperature below the annealing point temperature of the glass composition. By heating the pressed article and the mold and/or plunger to the annealing temperature of the glass, the glass is annealed while simultaeously meltably removing the mold and/or plunger.

BACKGROUND OF THE INVENTION

In the past it has not been possible to press-form intricate articles having undercut or recessed portions from molten glass, due to the fact that the undercuts and recesses prohibited the mold and plunger from subsequently being withdrawn from the formed article. Accordingly it has been necessary to utilize multiple operations, such as press and blow, blow and blow, or centrifugal casting in order to form hollow glass articles having undercut or recessed portions.

It is well known in the metal casting art to utilize such expedients as lost wax, frozen mercury, and fused-cast salts in order to produce intricate hollow metal articles; however, these expedients are not entirely satisfactory for use in the glass art due to the unique physical characteristics of glass. That is, the molten glass must be quickly cooled by the forming members to obtain a glass viscosity which will retain the desired configuration before the forming members are consumed by the heat of the glass, which would not be possible with wax. However, the glass cannot be subjected to a severe chilling operation such as occasioned by frozen mercury, without producing detrimental surface cracks and fissures in the article due to surface shrinkage. Further, due to the fact that glass becomes brittle when set, the relative expansion and contraction of the glass with respect to the forming material must be taken into consideration, since a contraction of the newly formed glass article on a rigid forming material such a fused-salt would probably cause the article to shatter. Finally, the relative melting temperatures of the forming material and the glass must be such so that the forming members can accurately form an article from the molten glass before being consumed by the heat thereof, but yet the forming material must be meltably removable from the newly formed glass article at a temperature below that at which the article will deform.

SUMMARY OF THE INVENTION

The present invention provides a unique method of press-forming intricate articles having undercuts and recessed portions from glass, by meltably removing the forming members from the newly formed glass article without detrimentally affecting the configuration thereof. In carrying out the invention, a plunger and/or mold, formed of a suitable metal or metal alloy having a melting temperature below the softening point of the glass being formed, and preferably below the annealing temperature thereof, are utilized to press-form a charge of molten glass into an intricate article having the desired configurations. The consumable plunger and/or mold, in conjunction with the newly press-formed glass article, are positioned upon a grate or drain basin within a suitable kiln maintained at a temperature below the softening point of the glass, and preferably at about the annealing temperature thereof. The glass is annealed in the kiln and the consumable plunger and/or mold become molten and drain from the newly formed glass article which retains its original press-formed shape.

It thus has been an object of the present invention to provide a unique method of forming intricately shaped glass articles by press-forming the same with consumable or meltable forming members which may subsequently be removed from the newly formed article by melting.

BRIEF DESCRIPTION OF THE DRAWING

The figure is a cross-sectional view in elevation of a mold and plunger illustrating one application of the method of the present invention.

DESCRIPTION OF THE PREFERRED EMBODIMENT

By utilizing a mold and/or plunger which may be melted away from a newly formed glass article, I have found that it is now possible to press-form intricate articles having recesses and undercuts, which heretofore were impossible to form using known pressing methods. When forming a glass article having a reverse draft or exterior recesses, it is necessary that the mold be made of a consumable or meltable material; however, when the exterior of the article is formed with a conventional draft and no undercuts or recessed portions, a conventional mold may be utilized. In a like manner, the consumable plunger is only applicable in those instances where an undercut or recess is desired in a hollow article.

Referring now to the drawing, a mold M of suitable meltable material such as aluminum or aluminum alloy, is shown having a reverse draft. A plunger P is shown forced into a glass charge so as to form a hollow article A having a recess or undercut portion R. The plunger P is also formed of a similar meltable material as the mold M. Preferably both the mold and the plunger are made of a material which melts below the annealing point of the glass from which the article A is formed, so that the article may be simultaneously annealed while the mold and plunger are meltably removed and drained from the newly formed article A. However, any compatible material which will melt below the softening point of the glass composition from which the article is formed may be utilized, with main criterion being that the plunger and/or mold composition must melt at a temperature below that temperature at which the newly formed article will deform. Not only is it necessary to maintain the exact configuration initially formed, but also the dimensional accuracy thereof must be maintained during the removal of the meltable plunger and mold.

Referring now to the figure, a charge of molten glass is delivered to the mold M, formed of a pure metal or metal alloy having a melting temperature below the softening temperature of the charged glass composition, and the plunger P is moved relative to the mold so as to press-form the article A from the molten charge. The plunger is also made of a material substantially identical to that of the mold, so that it too will melt below the softening point of the glass composition. Both the plunger P and the mold M are preferably, although not necessarily, at room temperature before the charging and pressing operation begins, and accordingly the mold and plunger function to accurately form an article into a desired shape before being melted or fused by the hot glass charge. Further, the heat of fusion of the metal, from which the plunger and mold are formed, functions to chill the surface of the newly formed areas of the article so as to retain their desired shape, even though the plunger and mold begin to melt. Immediately after forming, the mold, plunger, and newly formed article are placed upon a suitable drain basin or grate in a kiln or annealing furnace so as to anneal the article A and simultaneously remove the meltable mold M and plunger P from the article. The metal forming the mold and plunger is recovered for further use.

As a specific example, but by no means limiting in nature, a charge of glass was delivered at a temperature of 1450° C. to an aluminum mold while at room temperature. An aluminum plunger, also at room temperature, was utilized to press the article into a desired hollow shape having an undercut portion. Immediately thereafter the combined mold-article-plunger was positioned upon a drain basin within a kiln set at 680° C., the annealing temperature of the glass composition, so that the aluminum mold and plunger, having a melting temperature of about 660° C., drain from the newly formed article as the article was simultaneously annealed. The article remained in the kiln until it was fully annealed and the meltable mold and plunger was fully melted and drained therefrom.

Although I have disclosed the now preferred embodiment of my invention, it will be apparent that various changes and modifications may be made thereto without departing from the spirit and scope thereof as defined in the appended claims.

I claim:

1. A method of press-forming a charge of molten glass between a pair of forming members into an article having a recessed portion which comprises, delivering a charge of molten glass to a mold forming member, relatively moving a plunger forming member toward said mold so as to press-form a glass article of desired configuration therebetween, said plunger being formed of a metal having a melting temperature below the annealing point temperature of the glass composition forming the article, heating the newly formed glass article and said plunger to a temperature below the softening point of the glass composition from which the article is formed and maintaining them at the annealing temperature of the glass immediately after forming so as to meltably remove the plunger from the newly formed article.

2. A method of forming articles as defined in claim 1 including the steps of forming both the mold and the plunger members of an aluminum composition, subjecting the newly formed article together with both such members to a temperature equivalent to the annealing temperature of the glass composition from which the article is formed, and simultaneously annealing the article and meltably removing both the mold and plunger therefrom.

References Cited

UNITED STATES PATENTS

| 301,329 | 7/1884 | Beck | 65—23 |
| 807,459 | 12/1905 | Harloe | 65—23 |
| 3,441,397 | 4/1969 | Sturgill | 65—23 |

S. LEON BASHORE, Primary Examiner

J. B. HARDAWAY, Assistant Examiner

U.S. Cl. X.R.

65—69, 72, 117, 362, 374